United States Patent [19]

Montgomery et al.

[11] Patent Number: 4,847,021
[45] Date of Patent: Jul. 11, 1989

[54] PROCESS FOR PRODUCING HIGH DENSITY CARBON AND GRAPHITE ARTICLES

[75] Inventors: Lionel C. Montgomery, Bay Village; John M. Criscione, Parma, both of Ohio

[73] Assignee: Union Carbide Corporation, Danbury, Conn.

[21] Appl. No.: 189,762

[22] Filed: May 3, 1988

Related U.S. Application Data

[63] Continuation-in-part of Ser. No. 878,900, Jun. 26, 1986, abandoned.

[51] Int. Cl.$^4$ .................. B29C 43/10; C01B 31/02; C01B 31/04
[52] U.S. Cl. .................. 264/29.3; 264/29.6; 264/313; 264/317; 264/320; 264/570; 423/448; 423/449; 425/405.2
[58] Field of Search .......... 264/29.1, 29.3, 29.6, 264/105, 313, 320, 570, 317; 425/405.2; 423/448, 449

[56] References Cited

U.S. PATENT DOCUMENTS

| | | | |
|---|---|---|---|
| 2,461,365 | 2/1949 | Bennett et al. | 264/29.6 |
| 2,493,383 | 1/1950 | Bennett et al. | 264/29.1 |
| 3,001,237 | 9/1961 | Balaguer | 264/29.1 X |
| 3,246,056 | 4/1966 | Shea, Jr. et al. | 423/449 |
| 3,249,964 | 5/1966 | Shaler | 264/29.1 X |
| 3,370,113 | 2/1968 | Goeddel | 264/29.1 X |
| 3,419,645 | 12/1968 | Pietzka et al. | 423/449 |
| 3,419,935 | 1/1969 | Pfeiler et al. | 425/405.2 X |
| 4,081,505 | 3/1978 | Kawai | 264/313 |
| 4,469,650 | 9/1984 | Inoue | 264/313 X |

FOREIGN PATENT DOCUMENTS

| | | | |
|---|---|---|---|
| 664517 | 6/1963 | Canada | 264/29.3 |
| 62400 | 10/1982 | European Pat. Off. | 423/449 |
| 1587312 | 7/1964 | France | 423/448 |
| 60-191012 | 9/1985 | Japan | 264/29.1 |
| 967139 | 8/1964 | United Kingdom | 264/320 |

OTHER PUBLICATIONS

Lange, F. F. et al., "The Powder Vehicle Hot-Pressing Technique", Ceramic Bulletin, vol. 52, No. 7 (1973), pp. 563-565.

Primary Examiner—Jeffery Thurlow
Assistant Examiner—Leo B. Tentoni
Attorney, Agent, or Firm—James L. Sonntag

[57] ABSTRACT

Carbonaceous powders are blended with a high coking value pitch, e.g. mesophase pitch, formed into shaped bodies and then simultaneously compressed and baked in an envelope of finely divided, non-reactive particles, followed by graphitizing, if required, to produce high strength, high density carbon or graphite articles.

24 Claims, 2 Drawing Sheets

PROCESS FOR PRODUCING HIGH DENSITY CARBON AND GRAPHITE ARTICLES

This application is a continuation-in-part of Ser. No. 878,900, filed 06/26/86, now abandoned.

FIELD OF THE INVENTION

The present invention relates to an improved process for producing high strength, high density carbon and graphite articles. More particularly, the invention relates to an improved process for producing such articles which is fast and economical and which does not require impregnation of the shaped articles after baking in order to improve their density.

BACKGROUND OF THE INVENTION

Shaped carbon articles are conventionally produced by mixing a finely divided carbonaceous filler and a binder and then molding the mixture into shaped bodies. The carbonaceous filler may be a petroleum or coal coke, pitch coke, powdered graphite, carbon flour or the like. The binder is usually tar or pitch derived from either petroleum or coal. The shaped bodies are then baked at a sufficiently high temperature to carbonize the binder and exclude volatile materials contained therein.

After the shaped bodies have been baked, they are usually impregnated with a liquid pitch and then rebaked again at elevated temperatures in order to reduce their porosity. Depending on the particular application, it may be necessary to impregnate and rebake the shaped bodies several times until the desired porosity and density are achieved. Following the impregnation and rebaking steps, the shaped bodies may be heated to graphitizing temperatures, e.g about 3000° C., in order to produce graphite articles.

This conventional process for producing dense carbon and graphite articles is extremely slow and time-consuming, often requiring five to eight months, to complete the fabrication of relatively large size graphite articles. Unfortunately, the long time periods that are required to fabricate these articles necessitate large inventories and generally make it difficult to respond to the changing needs of customers. In addition, the multiple impregnation and rebaking steps that are employed in the conventional process also require the installation and maintenance of expensive pollution control equipment which also increases the product cost.

U.S. Pat. No. 3,419,645 to Pietzka describes a process for preparing shaped carbon bodies wherein a finely ground coke is blended with a hard pitch, the pitch having a softening point of at least 100° C. The mixture of hard pitch and coke powder is then intimately mixed with a dispersion of colloidal graphite and water and then shaped by means of a press under pressures ranging from 20 to 300 kg/cm². After pressing, the shaped bodies are dried at temperatures in the range of from 60° C. to 110° C. The dried pressed bodies may by then either baked to form porous carbon bodies, which may be optionally impregnated, or they may be densified by after-pressing at an elevated temperature, preferably at a temperature in the range of from 30° C. to 50° C. below the softening point of the hard pitch, and subsequently baked to form dense carbon bodies.

French Patent No. 1,587,312 describes a method for producing high density graphite articles wherein a preformed, baked and fully graphitized body is placed in a mold and surrounded by a layer of finely pulverulent, refractory material. The pulverulent material is a poor conductor of heat and electricity e.g. carbon black powder, and is applied around the graphite body to a thickness which is not greater than 10% of the diameter of the body. The body is then heated while surrounded by the pulverent material to a temperature of between 3100° C. and 3650° C. and a static pressure is exerted on the body via the pulverulent material, the pressure being in the range of between 100 and 400 kg/cm².

U.S. Pat. No. 3,246,056 to Shea et al. describes surrounding a performed carbonaceous shape with a deformable, pressure transmitting, fluid-impermeable envelope, and applying a pressure to the envelope while heating. The fluid-impermeable envelope contains the gasses generated during heating to prevent formation of voids in the final product.

Lange et al, in an article entitled "The Powder Vehicle Hot-Pressing Technique" published in the Westinghouse Research Laboratory Ceramic Bulletin, Volume 52, No. 7, 1973, describe a hot-pressing technique using a powder vehicle, such as graphite powders, to transfer pressure onto a complex shaped object during densification via an axial stress. The object to be densified is preshaped using a conventional ceramic forming technique, e.g. isostatic pressing, slip casting, injection molding, etc. The object is then embedded in the powder vehicle which is contained within a cylindrically shaped hot-pressing die with end plungers. At the temperature required to densify the preshaped object, a load is applied to the powder vehicle through the end plungers.

OBJECTS OF THE INVENTION

An object of the invention is to provide a method for carbonizing and densifying shaped articles of carbon filler and pitch binder without separate baking and impregnation steps.

Another object of the invention is to bake and densify carbon filler/pitch shapes in one process step.

Other objects of the invention will become evident in the description that follows.

SUMMARY OF THE INVENTION

An embodiment of the invention is a process for producing high strength, high density carbon articles which comprises;

(a) mixing finely divided carbonaceous filler and pitch binder having a coking value of at least 70 percent, (b) forming the mixture into a shaped body, (c) embedding the shaped body within a gas-permeable envelope of finely divided, non-reactive particles;

(d) applying a mechanical load upon the envelope of finely divided, non-reactive particles such that the non-reactive particles transfer a pressure to the embedded shaped body, wherein the pressure is sufficient to densify the shaped body, (e) heating the shaped body while applying the load in (d) to a temperature sufficient to carbonize the pitch binder; wherein the applying of the load in (d) and the heating of the shaped body in (e) are carried out at ambient gas pressure, and the finely divided, non-reactive particles are sized to allow escape through the gas-permeable envelope of volatile gasses generated during the heating of the shaped body.

It has been found in accordance with the present invention that high strength, high density carbon and graphite articles can be fabricated rapidly, economically and efficiently by using a hot-pressing technique, without the need to repeatedly impregnate and rebake the article as required by conventional processes. A shaped carbon body, molded from a mixture of carbonaceous filler and a high carbon value pitch binder, is compressed in an envelope of finely divided, non-reactive particles, such as graphite powder. The packed carbon body is compressed while being heated to baking temperatures.

A problem in the prior art is that a shaped carbon body could not be hot pressed at elevated baking temperatures without cracking due to the significant outgassing of volatiles that takes place during the bake or curing of the binder. Accordingly, it was necessary to first bake a shaped body and allow evolution of the volatiles, and then densify the shape by a succession of pitch impregnation and baking steps. However, it has now been found in accordance with the present invention, that hot-pressing techniques can be successfully employed to both densify and bake a shaped carbon body simultaneously thereby, greatly simplifying the process and reducing the operating time and cost.

Shaped carbon and graphite articles produced according to the present invention are characterized by their high strength and low porosity and also by their very fine grain internal structure. For example, graphite articles have been made by the present process which exhibit a compressiVe strength of 14,000 psi, a coefficient of thermal expansion (CTE) of 3 to $5 \times 10^{-6}$ in./in./°C. and a porosity of only about 15 percent. These physical properties are generally equivalent to those of graphite produced by two conventional pitch impregnation and rebaking cycles.

The outstanding physical properties of shaped carbon and graphite articles produced according to the present invention make them ideally suited for use in many of the present-day high technology applications. In one such application, for example, hot press baked graphite shapes up to 24 inches in diameter are coated with silicon carbide and employed as susceptors for use as heat sources and containers in the preparation of microcircuits on epitaxial silicon.

Aside from producing shaped carbon and graphite articles having outstanding physical properties, the process of the present invention offers many other unique advantages. First of all, the present process is significantly faster than the conventional process primarily because the steps of impregnation and rebaking have been eliminated. Typically, a 20 inch diameter by 7.5 inch thick carbon billet can be successfully hot press baked in approximately 15 hours compared to about 50 hours for a similar size billet baked by conventional methods. Moreover, since the process of the present invention can be carried out more rapidly, it is not necessary to maintain a high inventory of shaped articles during the manufacturing process. Consequently, it is relatively easy to respond quickly to customers needs as they change to meet the varying demands of industry.

The present process is simple and economical and can be quite easily adapted to automatic or semi-automatic operation. Furthermore, since the impregnation and rebaking steps are eliminated, there is no need to install and maintain costly pollution control equipment.

Due to the significant outpassing of volatiles that takes place during the baking or curing operation, it is surprising to find that a shaped carbon body can be successfully hot press baked without cracking or other harmful effects according to the process of the present invention. Without being bound to a theory, it is believed that the pressure applied to the shaped body via the non-reactive particles counteracts the tensile forces that are set up in the body by the outgassing of volatiles from the pitch during curing and, as a result, permits relatively rapid baking of the densified shapes. Consequently, the pressure applied to the shaped body during the hot press bake should not be so high as to destroy this balance of internal stresses and produce a body which is so dense as to possibly preclude the passage of volatiles and result in cracking or other harmful effects.

DESCRIPTION OF THE INVENTION

Figure 1:
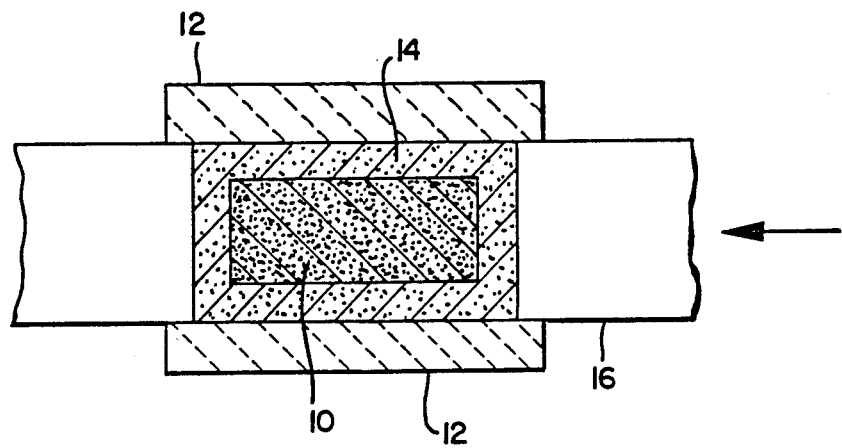
FIG. 1 is a schematic, cross-sectional view in elevation of a mold illustrating an embodiment of the invention.

In the practice of the present invention, the carbonaceous filler may in the form of a fiber or particulate, and may be, for example, a finely divided petroleum coke, graphite flour, raw coke, carbon black or the like. The carbonaceous filler material should be ground to a fine particle size before mixing with the pitch binder. For preparing dense carbon articles having excellent internal structure and porosity, it is recommended that the filler have a particle size of less than about 100 mesh (0.149 mm). A preferred filler is graphite flour with a particle size less than 200 mesh (0.074 mm). Reference to mesh sizes are to the Tyler Standard series.

The pitch binder should have a coking value of at least about 70 percent or greater. By the term "coking value", as used herein and in the appended claims, is meant the percentage of coke that is present in the residue from a given sample of carbonaceous material after the sample has been heated to a predetermined baking temperature at a given rate of temperature rise, according to the procedure of ASTM-D2146.

A suitable pitch binder is a milled pitch having a high coking value of at least about 70 percent and a high softening point above about 300° C. A preferred pitch binder for use in the mixture is a mesophase pitch having a coking value in the range of between about 75 and about 90 percent and a softening point of about 330° C., The ratio of carbonaceous filler to pitch binder in the mixture to form the shaped body may vary within a range of from about 4:1 to about 2:1. A suitable mixture for use in forming the shaped bodies in the process of the present invention may comprise, for example, from about 70 to about 85 weight percent carbonaceous filler, e.g. petroleum coke or graphite flour, and from about 15 to 30 weight percent binder, e.g. mesophase pitch.

The carbonaceous filler and binder are thoroughly blended for a sufficiently long period of time to assure a uniform mixing of all the components. The mixing operation may be carried out, for example, in a conventional Vee Blender for about one hour or more.

After mixing, the mixture is formed into a shaped body preferably by molding. During the molding of the shaped body, the mixture of carbonaceous filler and pitch may be compressed under a pressure of about 200 psi while heated to elevated temperatures up to the softening point of the pitch binder as a maximum, e.g. about 330° C. in the case of mesophase pitch. Alternately, the mixture may be cold pressed at a higher pressure, for example, between about 400 psi and about 800 psi at room temperature. The latter is of course preferred since the process is faster and more economical. However, the density of the cold press-molded shaped body will generally be lower, e.g. about 63 percent of theoretical at 750 psi. Higher theoretical densities of about 80 percent or more are possible when the mixture is shaped at about the softening point of the pitch binder.

The finely divided, non-reactive particles in which the shaped body is embedded may be made of any material which will not react or decompose when heated to elevated baking temperatures of about 750° C. or more. Suitable materials for the non-reactive particles are graphite, coke and boron nitride, for example. In those cases where the shaped body is to be graphitized inside the die after baking, the particles should be made of a material which is highly refractory and able to withstand the effects of graphitizing temperatures. Graphite powders are preferably used as the non-reactive particles in this instance.

Generally speaking, the particular size of the non-reactive particles is not too narrowly critical. However, the particles should not be so small as to preclude the escape or egress of volatile gases through the porous envelope during the baking operation. It has been found that graphite powders having an average particle size of about 10 mesh (1.68 mm) are ideal for use in the practice of present invention. However, graphite powders having a particle size as small as 400 mesh (0.037 mm) may also be employed without adversely affecting gas venting through the porous envelope.

The shaped body is surrounded by the non-reactive particles so as to completely embed the shaped body within the envelope. The particles are packed around the body in a relatively thick layer, e.g. about 2-4 inches in the case of a shaped body having an average diameter of about 20 inches.

The shaped body embedded in the non-reactive particles is then compressed while being heated to a baking temperature, a temperature sufficient to carbonize the pitch binder in the shaped body. Preferably, the shaped article is heated slowly at a predetermined rate of temperature rise up to a suitable baking temperature, e.g. about 750° C. The particular rate of temperature rise used To heat the shaped body will vary depending upon the size of the article being fabricated. For example, a 20 inch diameter by 15 inch long cylindrical billet may be heated to a baking or curing temperature without cracking or other adverse effect at a rate of about 50° C., per hour. It will of course be evident that larger size billets will require a slower rate of temperature rise while, on the other hand, smaller billets may be heated at an even faster or more rapid rate. The shaped body is preferably heated inductively. Other means for heating the shaped body in the die while surrounded by the envelope can of course be employed.

After the shaped body has reached a temperature which is approximately equivalent to the softening temperature of the pitch binder, a pressure is applied to the envelope of non-reactive particles. This may be accomplished by applying a load to an end plunger of the mold containing the envelope of non-reactive particles. The pressure is transferred via the non-reactive particles, and applied isostatically around the entire surface of the shaped body, which compresses and further densifies the body. The temperature of the shaped body is gradually raised to the maximum baking temperature during the entire compression. Moreover, the pressure that is applied isostatically around the shaped body should be kept at a relatively low pressure, g. about 200 psi. This is particularly important in the cases where the shaped body is to be subsequently graphitized after baking. It has been found that shaped bodies compressed at higher pressures, e.g. in excess of about 400 psi, form a final carbon article so dense as to preclude the escape of gaseous impurities that develop when the baked carbon article is heated to graphitizing temperatures. In such a case, the baked carbon article will crack or spall and be rendered useless.

Suitable pressures for use in compressing the shaped body while heating, according to the present invention, will generally range from about 200 to 350 psi. Higher pressures should be preferably avoided even in the case where the shaped body is not subsequently graphitized.

Graphitization of the compressed and heated carbon body can take place while the body still remains inside the die. In such case, suitable means must be provided in association with the die for heating the body to elevated graphitizing temperatures, e.g. at least about 2800° C. However, it may be preferable to remove the baked body from the die after cooling and then transfer the cooled body to a separate graphitizing furnace.

In one embodiment of the invention, the blended mixture is molded to a desired shape by compressing in a suitable mold, e.g. a graphite mold. The shape is then removed from the mold and placed in an envelope of non-reactive particles. As illustrated in FIG. 1. the shaped body 10 molded from the mixture is placed inside the cavity of a die 12 and surround by a porous envelope 14 made of finely divided, non-reactive particles. The die 12 is suitably made of graphite or other refractory material and has at least one end plunger 16. The shaped body is heated within the mold, and is compressed by applying a load to the plunger of the mold.

In another embodiment, the shaped body is formed from the mixture by molding the mixture in a container means. The container means has an outer surface partially embedded by finely divided non-reactive particles. During the molding of the shaped body. the non-reactive particles resist the pressure applied during the molding and thereby maintain the shape of the container. A substantial portion of the wall of the container means is of a material that allows passage of gasses generated during the heating of the shaped body to carbonize the pitch binder. Alternately, the container means may be removed from around the shape after molding.

Figure 2:
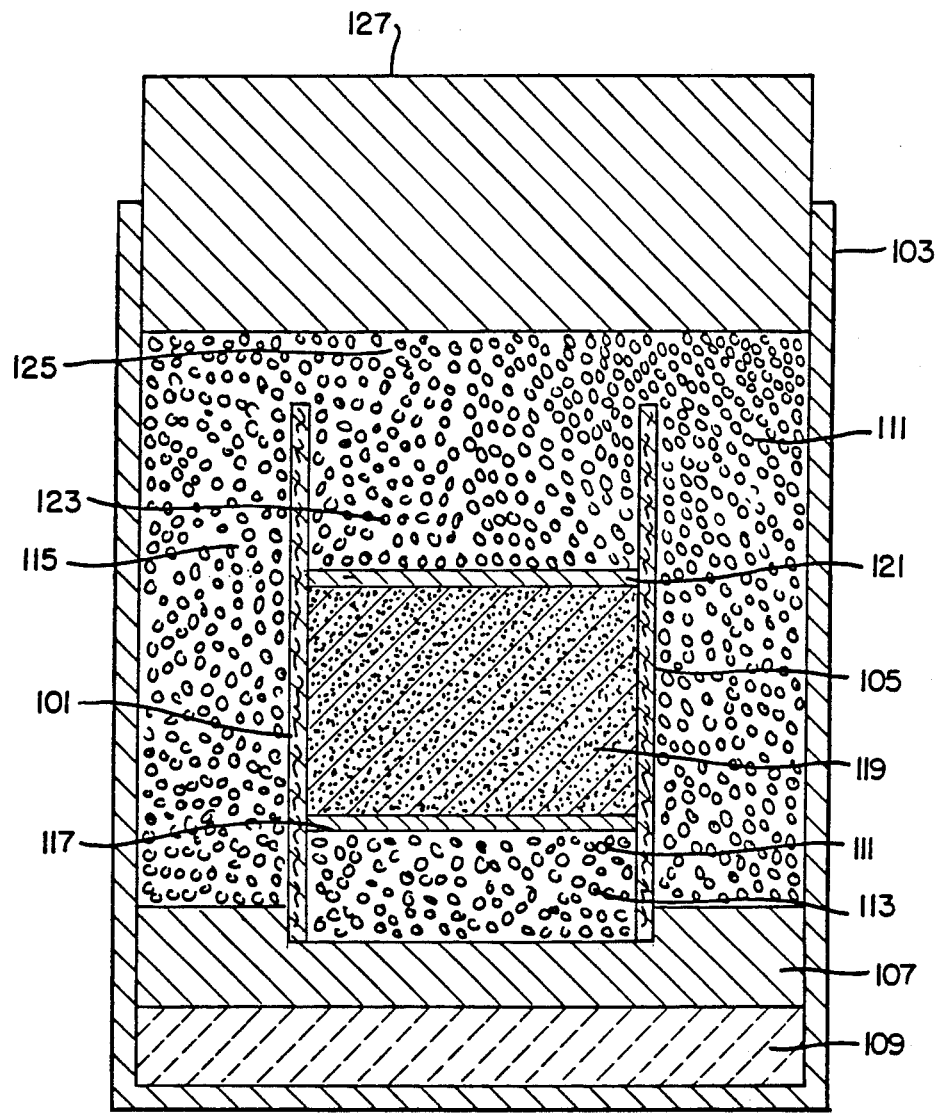
FIG. 2 is a schematic, cross-sectional view in elevation of a mold illustrating another embodiment of the invention.

An illustration of this embodiment is shown in FIG. 2. Referring to FIG. 2, a container means 101 is placed into a graphite mold 103. The container means comprises a tube 105 to form the lateral walls of the container means 101 and a bottom spacer 117. The tube 105 is maintained in the center of the mold 103 by a carbon fixture 107 with an underlayer 109 of an insulating material such as Thermax TM. Non-reactive particles 111 are placed into the bottom 113 of the tube 105 and the annular space 115 between the outside surface of the tube 105 and the inner surface of the mold 103. Upon the non-reactive particles 111 in the bottom 113 of the tube is placed a bottom spacer 117, preferably of carbon. Thus is formed the container means 101 comprising the tube 105 and the bottom spacer 117. Into the container means 101 is placed a mixture of finely divided carbonaceous filler and pitch. The mixture is cold pressed by a ram (not shown), typically at about 500 psi, to form a shaped body 119 within the container means 101. The non-reactive particles 111 in the bottom 113 of the tube 105, and in the annular space 115 resist the pressure of the cold pressing and maintain the integrity of the container means 101. An upper spacer 121, preferably of carbon. is placed on the top of the shaped body 119 within the tube 105, and further non-reactive particles 111 are placed in the remaining or top portion 123 of the tube, and above the top of the tube 105. Thus, the shaped body 119 is embedded or surrounded by non-reactive particles 111. A plunger 127 is fitted to the mold 103, and the shaped body 119 is heated within the mold 103, and is compressed by applying a load to the plunger 127.

A substantial portion of the material of the container means is such that when the shaped body is heated, gasses may pass through the container means. This may be accomplished by a material that is gas-permeable, or by a material that is consumed when the shaped body is heated. Gas-permeable materials include porous materials which are non-reactive with graphite, such as porous ceramic or carbonaceous materials. Consumable materials include, for example, cellulosic materials, such as paper and cardboard, synthetic polymeric materials, such as polyethylene. and the like. In the specific embodiment illustrated in FIG. 2, this is accomplihed by providing a tube 105 of cardboard that pyrolizes at the baking temperatures. If it is desired to graphitize the final carbon article, the article may be heated within the bed of non-reactive particles without removing the shape.

EXAMPLE 1

37.44 lbs. of graphite flour (78 wt %) was mixed with 10.56 lbs. of mesophase pitch (22 wt %) having a partical size less than 65 mesh (0.210 mm) a softening point of about 320° C. and a coking value of 75%. The graphite flour was sized such that 90 wt % passed through a 200 mesh screen. The mixture was thoroughly blended in a Vee Blender for a period of about 60 minutes. The blended mixture was then cold-pressed in a graphite mold into a shaped cylindrical billet approximately 12 inches in diameter by 6 inches long at a pressure of approximately 750 psi. The billet had a density of about 63% of theoretical after cold-pressing. The cold-pressed billet was then heated over a period of about 4 hours to a temperature just above the softening point of the pitch, i.e. 330° C. and pressed under a pressure of 200 psi to densify the billet to about 80.9% of theoretical.

After cooling and removal from the graphite mold, the shaped and densified carbon billet or shaped body was placed inside the cavity of a graphite die and was surrounded by a layer or envelope of graphite particles having an average particle size of 10 mesh (1.68 mm), as illustrated in FIG. 1. The graphite particles were packed tightly around the shaped billet in order to assure that the billet was embedded within a relatively thick layer of particles, e.g. about 2-4 inches. The billet was then slowly heated inductively up to a baking temperature of about 750° C. over a period of 8 hours. Initially, a pressure of about 50 psi was applied and increased to 200 psi when the billet reached a temperature of 300° C., about the softening point of the pitch. A load was applied to the end plunger of the die to create the desired pressure on the packed envelope of graphite particles. After reaching maximum temperature, the pressure was maintained for a sufficiently long period (e.g. about 1½ hours) in order to assure that the pitch binder had been coked and too allow evolution of all the volatiles. The carbon article product was then removed from envelope of particles in the die and cooled. Its density was determined to be approximately 76 percent of theoretical. The baked billet was then placed in a graphitizing furnace and heated slowly at a rate of about 200° C. per hour until a final graphitizing temperature of approximately 2800° C. had been reached. The billet was held at this temperature for about one hour and then removed. The density of the graphite billet was determined to be 1.70 g/cm³, equivalent to about 76.6 percent of theoretical.

EXAMPLE 2

A cardboard tube with an inside diameter of 2 inches is centrally located within a graphite mold with an inside diameter of 3.5 inches. The tube is maintained in position in tne mold by a carbon fixture in the configuration shown in FIG. 2. The annular space between the inside surface of the mold and the outer surface of the tube is filled with graphite particles. The graphite particles are sized between −20 mesh (0.03 in.) and −35 mesh (0.015 in.). Graphite particles are also placed into the inside of the tube for a height of 3 inches and a carbon spacer, 0.25 inches thick, is placed on top of the particles. A blend of 78 wt. % graphite flour, and 22 wt. % mesophase pitch, as used in Example 1 is charged into the cardboard tube and coldpressed with a ram inserted into the tube at a pressure of 500 psi. A carbon spacer, 0.25 inches thick is place on top of the cold-pressed shaped body, and graphite particles are added to the tube and the annular space to give a minimum of 3 inches of particles above the carbon spacer. The graphite mold is fitted with plungers and the shape is densified and baked by applying a pressure of 200 psi to the graphite particles and heating the mold to 750° C. The density of the final product is comparable to that of Example 1.

What is claimed is:

1. A process for producing a high strength, high density carbon article which comprises;
   (a) mixing finely divided carbonaceous filler and pitch binder having a coking value of at least 70 percent,
   (b) forming the mixture into a shaped body,
   (c) embedding the shaped body within a gas-permeable envelope of finely divided, non-reactive particles;
   (d) applying a mechanical load upon the envelope of finely divided, non-reactive particles such that the non-reactive particles transfer a pressure to the embedded shaped body, wherein the pressure is sufficient to densify the shaped body,
   (e) heating the shaped body while applying the load in (d) to a temperature sufficient to carbonize the pitch binder;

wherein the applying of the load in (d) and the heating of the shaped body in (e) are carried out at ambient gas pressure, and the finely divided, non-reactive particles are sized to allow escape through the gas-permeable envelope of volatile gases generated during the heating of the shaped body.

2. A process according to claim 1 wherein the shaped body is formed from the mixture in step (b) by molding the mixture in a mold, and the shaped body is removed from the mold before embedding the shaped body in the envelope of finely divided, non-reactive particles in step (c).

3. A process according to claim 1 wherein the shaped body is formed from the mixture in step (b) by molding the mixture in a container means, the container means having an outer surface partially embedded by finely divided non-reactive particles such that the non-reactive particles maintain the shape of the container means during the molding of the shaped body, and wherein the container means allows passage of gasses generated in step (e) through the container means.

4. A process according to claim 3 wherein after the shaped body is molded, the shaped body is embedded in step (c) by fully embedding the container means with non-reactive particles by adding further non-reactive particles.

5. A process according to claim 1 wherein the shaped body is formed from the mixture in step (b) by molding the mixture in a container means, the container means having an outer surface partially embedded by finely divided non-reactive particles such that the non-reactive particle maintain the shape of the container means during the molding of the shaped body, and wherein a portion of the container means is consumed during the heating of the shaped body to allow the escape of the generated gasses through the gas-permeable envelope.

6. A process according to claim 5 wherein the portion of the container means consumed during heating of the shaped body comprises a material selected from the group consisting of cellulosic materials, and synthetic polymers.

7. A process according to claim 3 wherein a portion of the container means comprises material not consumed during the heating of the shaped body, and the material is permeable to gasses to allow passage of the volatile gasses through the container means.

8. A process according to claim 7 wherein the portion of the container means which is not consumed during the heating of the shaped body comprises a material selected from the group consisting of porous ceramics and porous carbonaceous materials.

9. A process according to claim 1 wherein the shaped body is formed from the mixture in step (b) by molding the mixture in a container means, the container means having an outer surface partially embedded by finely divided non-reactive particles such that the non-reactive particles maintain the shape of the container means during the molding of the shaped body, and wherein the container means is removed before fully embedding the shaped body in the non-reactive particles.

10. A process according to claim 1 wherein the binder is a mesophase pitch having a coking value of between about 75 and about 90 percent.

11. A process according to claim 10 wherein the mesophase pitch has a softening point of about 300° C.

12. A process according to claim 1 wherein the finely divided carbonaceous filler is a material selected from the group consisting of petroleum coke, graphite flour, raw coke, carbon black and mixtures thereof.

13. A process according to claim 12 wherein the finely divided carbonaceous filler has a particle size of about 100 mesh or less.

14. A process according to claim 1 wherein the ratio of carbonaceous filler to pitch binder in the shaped body is between about 4:1 and about 2:1.

15. A process according to claim 1 wherein the mixture is compressed to form the shaped body at room temperature.

16. A process according to claim 1 wherein the mixture is formed into a shaped body at a temperature close to a softening point of the pitch binder.

17. A process according to claim 2 wherein the mixture is formed into a shaped body under a pressure of about 200 psi.

18. A process according to claim 3 wherein the mixture is formed into a shaped body under a pressure of about 500 psi.

19. A process according to claim 1 wherein the finely divided, non-reactive particles are selected from the group consisting of coke particles, boron nitride particles and graphite powders.

20. A process according to claim 19 wherein the average size of the non-reactive particles is about 10 mesh.

21. A process according to claim 1 wherein the heating is sufficient to raise the temperature of the shaped body embedded in said envelope to a temperature of about 750° C.

22. A process according to claim 1 wherein the mechanical load upon the envelope of non-reactive particles in (d) is sufficient to apply a pressure between about 200 psi and 350 psi upon the envelope of non-reactive particles.

23. A process according to claim 1 wherein after steps (d) and (e), the shaped body is heated to a graphitizing temperature before it is removed from the envelope of non-reactive particles.

24. A process according to claim 1 wherein the carbon article is graphitized at a temperature above about 2800° C.

* * * * *

UNITED STATES PATENT AND TRADEMARK OFFICE
CERTIFICATE OF CORRECTION

PATENT NO. : 4,847,021

DATED : July 11, 1989

INVENTOR(S) : Lionel C. Montgomery
John M. Criscione

It is certified that error appears in the above-identified patent and that said Letters Patent is hereby corrected as shown below:

Column 1, line 59, "by" should read "be"

Column 3, line 22, "simultaneously thereby," shoud read --simultaneously, thereby--

Column 3, line 29, "compressiVe" should read "compressive"

Column 3, line 58, "customers" should read "customers'"

Column 5, line 30, insert "the" after "of"

Column 5, line 47, "To" should read "to"

Column 5, line 51, delete comma after "50° C."

Column 6, line 4, "g. about" should read "e.g. about"

Column 6, line 5, "cases" should read "case"

Column 6, line 59, "Thermax TM" should read "Thermax $^{TM}$"

UNITED STATES PATENT AND TRADEMARK OFFICE
CERTIFICATE OF CORRECTION

PATENT NO. : 4,847,021

DATED : July 11, 1989

INVENTOR(S) : Lionel C. Montgomery
John M. Criscione

It is certified that error appears in the above-identified patent and that said Letters Patent is hereby corrected as shown below:

Column 7, line 7, delete the comma after "carbon"

Column 7, line 18, "gasses" should read "gases"

Column 7, line 26, "polyethylene." should read "polyethylene,"

Column 7, line 27, "accomplihed" should read "accomplished"

Column 7, line 37, "cal" should read "cle"

Column 8, line 3, "too" should read "to"

Column 8, line 20, "tne" should read "the"

Column 8, line 29, insert comma after "Example 1"

Column 8, line 32, "place" should read "placed"

Column 9, line 10, "gasses" should read "gases"

UNITED STATES PATENT AND TRADEMARK OFFICE
CERTIFICATE OF CORRECTION

PATENT NO. : 4,847,021

DATED : July 11, 1989

INVENTOR(S) : Lionel C. Montgomery
John M. Criscione

It is certified that error appears in the above-identified patent and that said Letters Patent is hereby corrected as shown below:

Column 9, line 14, "with" should read "within"

Column 9, line 26, "gasses" should read "gases"

Column 9, line 35, "gasses" should read "gases

Column 9, line 36, "gasses" should read "gases"

Signed and Sealed this

Twenty-first Day of August, 1990

Attest:

HARRY F. MANBECK, JR.

*Attesting Officer*  *Commissioner of Patents and Trademarks*